United States Patent [19]
Ulm et al.

[11] 3,722,666
[45] Mar. 27, 1973

[54] TUBULAR CONVEYOR

[75] Inventors: Erwin H. Ulm, Westchester, Ill.;
Robert June, II, Birmingham, Mich.

[73] Assignee: Triskelion Corp., Franklin Park, Ill.

[22] Filed: Dec. 22, 1969

[21] Appl. No.: 887,006

[52] U.S. Cl. .................................198/213, 222/413
[51] Int. Cl. ..........................B65g 33/00, G01f 11/20
[58] Field of Search ........198/213, 15; 222/240, 372, 222/241, 412, 413; 416/176

[56] References Cited

UNITED STATES PATENTS

| | | | |
|---|---|---|---|
| 3,381,801 | 5/1968 | Rastoin | 198/213 |
| 3,459,409 | 8/1969 | Goldberger | 198/213 X |
| 2,467,682 | 4/1949 | Megargee | 198/213 |
| 1,226,278 | 5/1917 | Teves | 416/176 X |
| 2,858,011 | 10/1958 | Wahl | 222/413 X |

FOREIGN PATENTS OR APPLICATIONS 1,153,106   5/1969   Great Britain.........................198/213

*Primary Examiner*—Evon C. Blunk
*Assistant Examiner*—H. S. Lane
*Attorney*—Hume, Clement, Hume & Lee, Ltd.

[57] ABSTRACT

An improved conveyor for particulate solids which comprises a tubular housing, a flexible, longitudinal central core member, and a flexible helical member. The helical member is positioned around the core member, and is in spaced relationship with the core member and the housing. Drive means are provided for rotating both the core member and the helical member in the same direction and at the same rotational speed. In one embodiment the invention also provides a conveyor housing a vertical intake guide assembly on one end, the guide assembly being particularly adapted to conveying granular materials from a drum or other container.

7 Claims, 5 Drawing Figures

INVENTORS.
ERWIN H. ULM
ROBERT JUNE II
BY Hume, Clement, Hume & Lee
Attorneys.

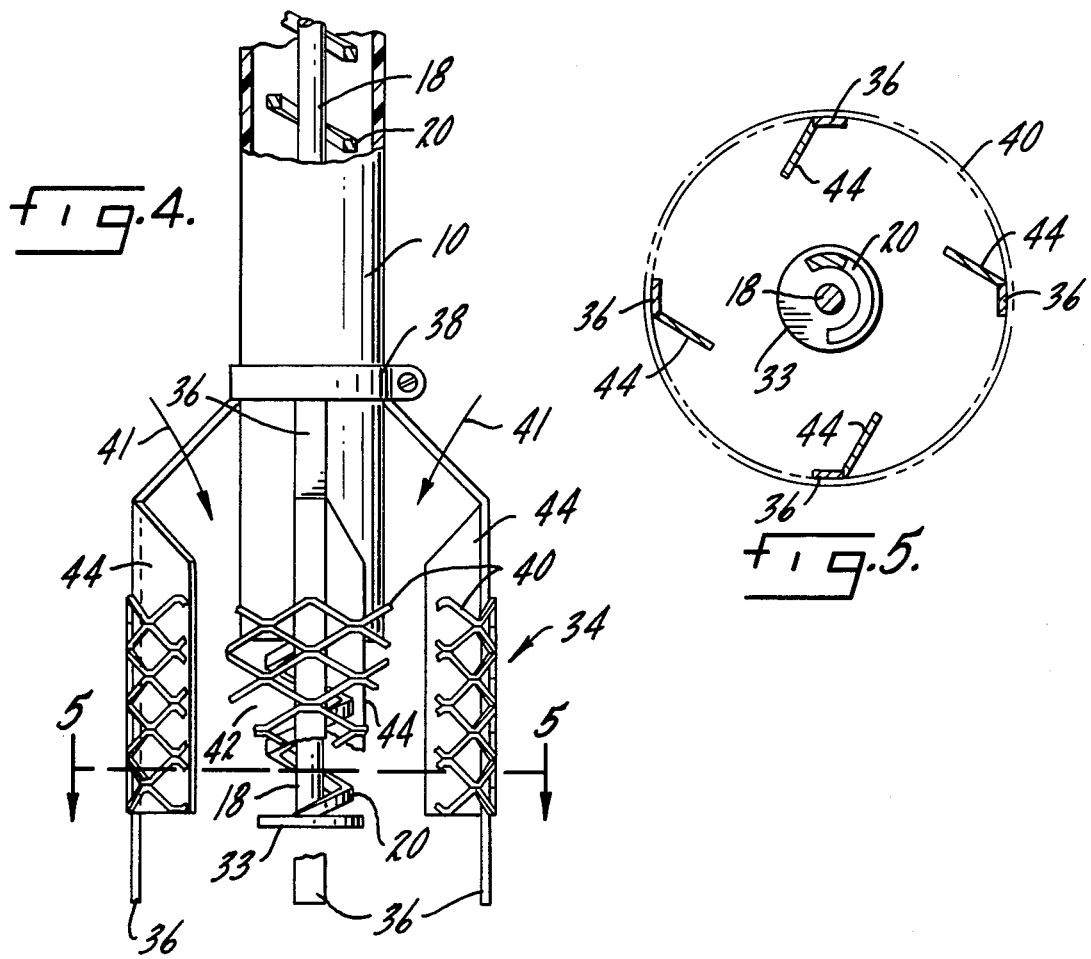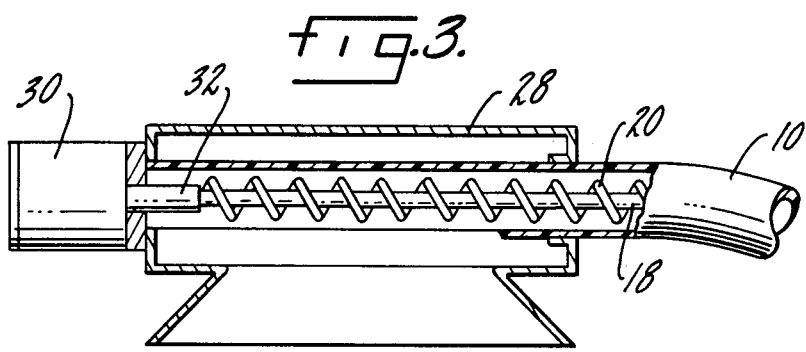

TUBULAR CONVEYOR

The present invention relates to an improved conveyor for particulate solids.

Tubular conveyors are well known in the art. A difficulty with many such conveyors is that they are incapable of achieving high feed rates with many types of material. Furthermore, high internal friction is often encountered with such devices, which causes wear and the production of fines with some materials.

Generally, the present invention relates to an improved tubular conveyor for conveying solid particulate materials. Basically, the invention comprises a tubular housing which has disposed therein a flexible, longitudinal central core member and a flexible helical member. The helical member is positioned around the core member, and is in spaced relationship with both the core member and the housing. Drive means are provided for rotating the core member and the helical member in the same direction and at the same rotational speed.

The invention will be best understood from the following detailed description, taken together with the drawings, in which:

FIG. 3 is a cross-sectional view of output direction control means incorporating drive means constructed in accordance with the present invention.

FIG. 4 is a plan view of a second embodiment of the present invention, illustrating a vertical intake guide assembly, partially cut away to show the interior thereof; and FIG. 5 is a cross-sectional view taken along line 5—5 of FIG. 4.

Figure 1:
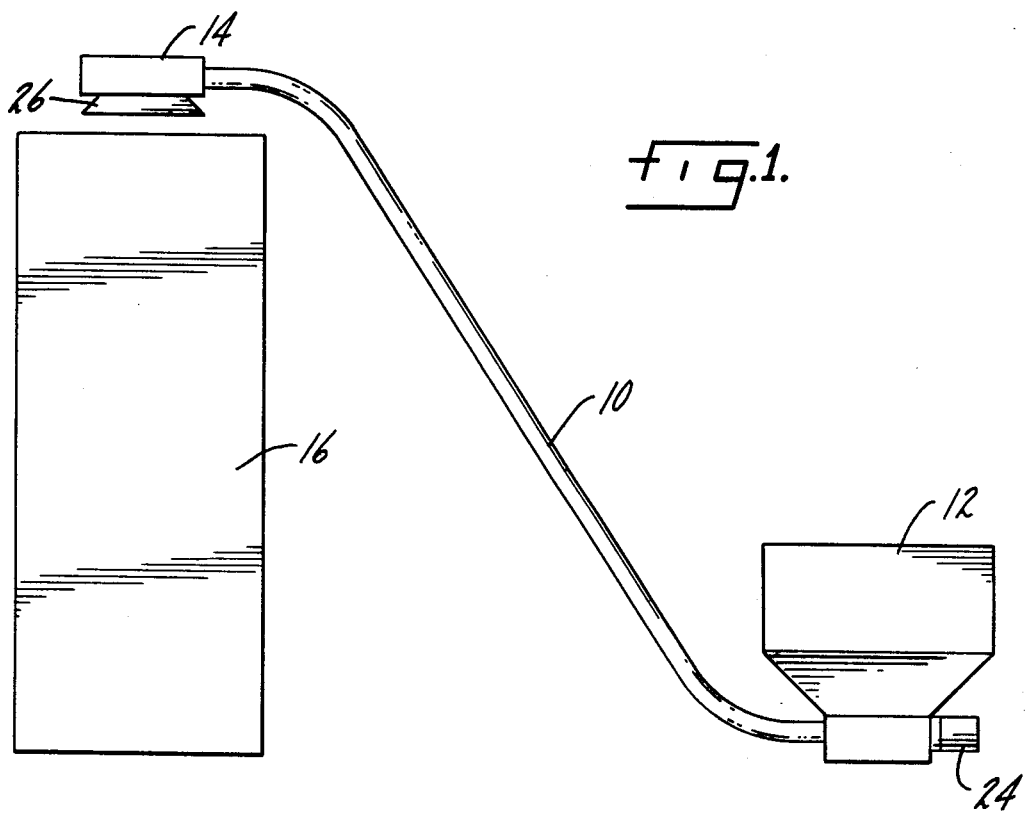
FIG. 1 is a plan view of an apparatus incorporating a tubular conveyor constructed in accordance with the present invention.
Figure 2:
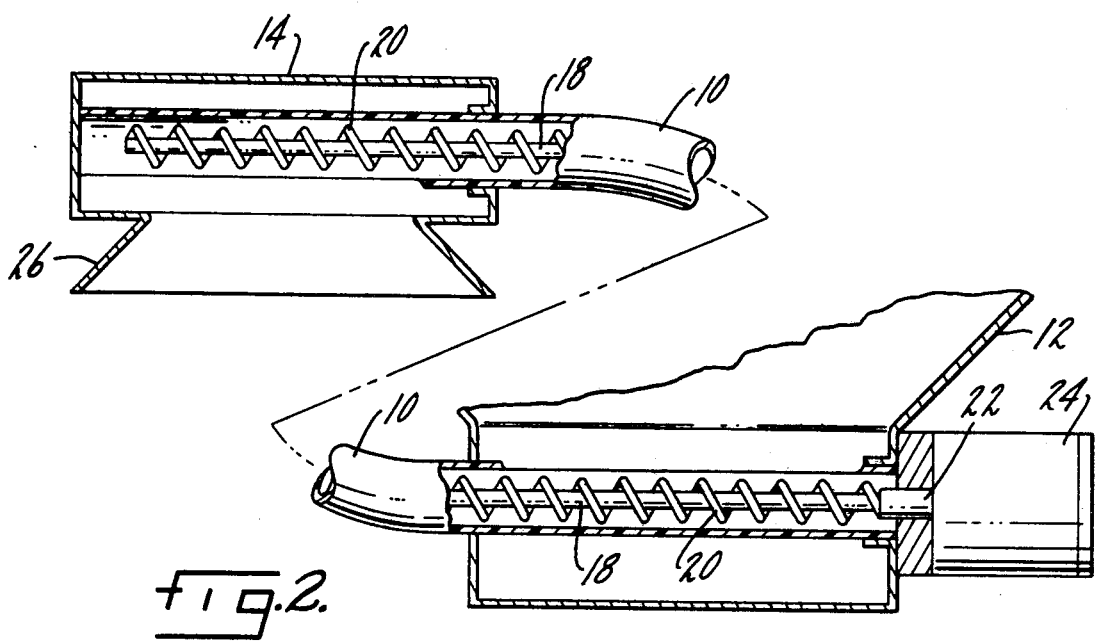
FIG. 2 is a fragmentary cross-sectional view of the conveyor shown in FIG. 1.

Referring to FIGS. 1 and 2, an apparatus constructed in accordance with the present invention comprises a tubular housing 10, which is preferably formed of a flexible plastic such as nylon. While it is desired in most applications that the tubular housing 10 be flexible, where the configuration of the conveyor is not to be changed, the housing 10 may be constructed of semi-flexible or non-flexible material such as high-density polyethylene or metal. Of course, if only a small degree of flexing were required, the housing 10 could be constructed of non-flexible material with flexible joints positioned along its length.

In the embodiment shown, the tubular housing 10 is flexible and provides communication between an input hopper 12 and output direction control means 14 at opposite ends of the tubular housing 10. As shown in FIG. 1, particulate material contained in the input hopper 12 is elevated and transferred through the flexible tubular housing 10 to output direction control means 14, where the particulate material is discharged into a bin 16.

Referring to FIG. 2, a flexible, longitudinal central core member 18 is disposed within the tubular housing 10, and runs along substantially the entire length thereof. The flexible core member 18 is surrounded by a flexible helical member 20. The helical member 20 is positioned in spaced relationship with both the central core member 18 and the housing 10. Both the core member 18 and the helical member 20 are free at one end, although they may be optionally attached to one another at the free end. At the opposite end, the core member 18 and helical member 20 are connected to a shaft 22 leading from suitable drive means such as an electric motor 24. Because both the core member 18 and the helical member 20 are connected to the same shaft 22, both the core member 18 and the helical member 20 will be rotated in the same direction and at the same rotational speed, i.e., the same number of revolutions per minute.

As shown in the FIG. 2, within the input hopper 12, the core member 18 and helical member 20 are not completely surrounded by a tubular housing. Instead, the tubular housing is open at the top in order to allow particulate solid material to flow downwardly into the conveyor.

At the opposite end of the conveyor the output direction control means 14 also provides an internal opening in the cylindrical surrounding of the core and helical members 18, 20, respectively. The output direction control means are also provided with a spout 26 which can be moved to control the direction of the output flow. In the embodiment shown, the flexible tubular housing 10 penetrates within both the input hopper 12 and the output direction control means 14, and is cut away in order to permit solids to be introduced into and removed from the flexible conveyor. However, it will be understood that there is no requirement that the tubular housing 10 be flexible within the input hopper 12 or the output direction control means 14, and therefore non-flexible materials may be used at this point. In fact, the tubular housing may simply be formed about the core and helical member 18, 20, while forming part of the structure of the input hopper and output direction control means.

A particular difficulty with tubular conveyors of the prior art is that they cannot be conveniently used to withdraw granular materials from drums, storage bins, and the like. As shown in FIGS. 3-5, wherein like parts are designated by like reference numerals, the tubular conveyor of the present invention may readily be adapted for such an application simply by positioning the drive means at the outlet end rather than the inlet end of the tubular housing, and most advantageously by also including a vertical intake guide assembly at the intake end of the tubular housing.

Referring to FIG. 3, the repositioning of the drive means at the outlet end of the tubular housing 10 is a simple matter. In this instance, a modified output direction control means 28 is employed, having an electric motor 30 mounted on the end thereof, opposite the end which communicates with the flexible tubular housing 10. The electric motor 30 has a shaft 32 which is connected to both the core member 18 and the helical member 20, as with the embodiment shown in FIG. 2.

Referring to FIG. 4, the free ends of the helical member 20 and core member 18 (opposite the electric motor 30) extend beyond the intake end of the flexible tubular housing 10. The helical and core members 20, 18, respectively, may be connected together at the free end, although such connection is not essential. As may be seen from FIGS. 4 and 5, in the most preferred embodiment, the free ends of the core member 18 and the helical member 20 are attached to a disc 33, which is preferably made of metal. The disc 33, which may be flat or dished, lies in the plane of rotation of the core and helical members 18, 20, respectively, and aids in feeding material into the helical member 20 and toward the tubular housing 10.

In order to facilitate feeding of particulate material to the helical member 20, the open end of the tubular housing 10 in this embodiment is surrounded by a vertical intake guide assembly, generally indicated by reference numeral 34. The vertical intake guide assembly 34 comprises a plurality of support members 36 which are spaced outwardly from the housing 10, and which extend longitudinally beyond the end of the core member 18 and the helical member 20. The support members 36 are mounted on the tubular housing 10 by a collar 38. Annular materials guide means 40 are mounted on the support members 36. These materials guide means 40 are adapted to permit the downward feeding of solid materials through the annular opening between the materials guide means 40 and the tubular housing 10, as shown by the arrows 41. The materials guide means 40 serve to maintain the particulate material in contact with the helical member 20, so that a gap will not be formed around the helical member 20, interrupting the flow of particulate material to the conveyor.

As shown in FIGS. 4 and 5, the materials guide means are cylindrical in configuration, and have a multiplicity openings 42 of a size sufficient to permit the passage of the particulate material that is being delivered through the conveyor.

In the most preferred embodiment, the vertical intake guide assembly 34 includes baffle means which are angled inwardly towards the helical member 20 in the direction of rotation. In the embodiment shown, baffles 44 are mounted on the support members 36.

In the operation of the apparatus shown in FIGS. 1 and 2, particulate material to be conveyed is simply placed in the input hopper 12 and the motor 24 is started, causing the core member 18 and the helical member 20 to rotate. While the rotation speed is not critical, in the preferred embodiment the core and helical members 18, 20, should be caused to rotate in the speed range of about 300 to 1,800 r.p.m. The rotation speed selected will depend upon a number of factors, including the material being conveyed and the speed of conveyance desired. For conveying delicate materials, such as fiberglass, it is preferred to select a speed toward the lower end of the preferred range. Material is carried through the tubular housing 10 and is discharged at the output direction control means 14 in a downward direction. Because both the core and helical members rotate at the same speed, there is a minimum of wear caused by occasional contact between the helical member 20 and the core member 18. In addition, grinding of the material and formation of fines during delivery through the flexible tubular housing 10 is minimized. Finally, the vibration of the freely rotating core member 18 agitates the material being conveyed, forcing it into the path of the helical member 20.

In the embodiment shown in FIGS. 3–5, the basic operation of the apparatus is the same as in the embodiment of FIGS. 1 and 2. In this embodiment, the end of the conveyor shown in FIG. 4 is inserted vertically into a drum or other container of particulate material, and is pushed downwardly into the material. Particulate material travels toward the rotating helical member 20 upwardly from the bottom, inwardly through the openings 42 in the materials guide means 40, and primarily downwardly through the annular opening between the materials guide means 40 and the flexible tubular housing 10, as shown by the arrows 41. The materials guide means 40 maintain the particulate material in contact with the helical member 20 so that these particles are not thrown away from the conveyor by centrifugal force. In addition, as the moving particles strike the baffles 44, they will be directed inwardly into contact with the moving helical member 20, facilitating their intake into the conveyor.

As shown in FIG. 4, in the most preferred embodiment of the present invention, the helical member 20 has a square or rectangular cross-sectional configuration. Such a configuration provides a flat surface in the direction of conveyance, and therefore improves the efficiency of the apparatus. However, the apparatus performs satisfactorily with a helical member 20 of virtually any cross-sectional configuration.

The helical member 20 is preferably made of a high-quality flexible metal, such as stainless steel or cold rolled steel. The core member 18 should be formed of a tough flexible material. In the diameter and configuration used for the core member 18, high density polyethylene forms a sufficiently flexible and highly suitable material. The core member 18 may also be formed of a tightly wound closed-pitch metal helix.

The apparatus of the present invention may be employed to convey a wide variety of particulate materials. It will be understood that the term "particulate material" refers to materials in many forms, including beads, powders, granules, crystals, etc., and that the size of the conveyor may be adapted to the particle size being conveyed. However, in its basic design, the apparatus is adaptable to use with a wide range of particle sizes, as long as the particles are not so large as to clog the conveyor. An example of materials that may be conveyed through the conveyor of the present invention are plastics, fiberglass, powders, wood flour, pellets, foundry sand, etc.

Obviously, many modifications and variations of the invention as herein before set forth will occur to those skilled in the art, and it is intended to cover in the appended claims, all such modifications and variations as fall within the true spirit and scope of the invention.

We claim:

1. An improved tubular conveyor for solid particulate materials comprising: a tubular housing formed of flexible material and having an intake end and an outlet end; a flexible, longitudinal central core member disposed within said housing; a flexible helical member positioned around the said core member, said helical member being in spaced relationship with said core member and said housing, the free ends of said core member and said helical member extending beyond the intake end of said housing; drive means at the outlet end of said housing for rotating said core member and said helical member in the same direction and at the same speed; a vertical intake guide assembly comprising a plurality of support members, said support members being spaced from said housing and extending longitudinally beyond the end of said core member and said helical member; materials guide means of cylindrical configuration, said materials guide means being mounted on said support members and adapted to permit the downward feeding of said solid materials toward said helical member and to maintain said solid materials in contact with said helical member, and said materials guide means having a multiplicity of openings of a size sufficient to permit the passage of said solid materials.

2. An improved tubular conveyor for solid particulate materials comprising: a tubular housing formed of flexible material and having an intake end and an outlet end; a flexible, longitudinal central core member disposed within said housing; a flexible helical member positioned around the said core member, said helical member being in spaced relationship with said core member and said housing, the free ends of said core member and said helical member extending beyond the intake end of said housing; drive means at the outlet end of said housing for rotating said core member and said helical member in the same direction and at the same speed; a vertical intake guide assembly comprising a plurality of support members, said support members being spaced from said housing and extending longitudinally beyond the end of said core member and said helical member; materials guide means of cylindrical configuration, said materials guide means being mounted on said support members and adapted to permit the downward feeding of said solid materials toward said helical member and to maintain said solid materials in contact with said helical member; and baffle means within said materials guide means, said baffle means being angled inwardly toward said helical member in the direction of rotation thereof.

3. The conveyor as defined in claim 2 wherein said guide assembly comprises four support members, and wherein said baffle means are mounted on said support members.

4. The conveyor as defined in claim 2 wherein the free ends of said core member and said helical member are connected to a disc.

5. An improved flexible conveyor for solid particulate materials comprising: a flexible tubular housing having an intake end and an output end; a flexible longitudinal central core member positioned within said housing; a flexible helical member positioned around said core member, said helical member being in spaced relationship with said core member and said housing, and the free ends of said helical and central core members extending beyond the intake end of said housing; a disc connected to the free ends of said helical member and said core member; output direction control means at the output end of said housing; a drive motor mounted on said output direction control means, the shaft of said motor being connected to said core member and said helical member at the output end thereof; a vertical intake guide assembly mounted at the intake end of said housing and comprising a plurality of support members, said support members being spaced from said housing and extending longitudinally beyond the end of said core member and said helical member; cylindrical materials guide means mounted on said support members and adapted to permit the downward feeding of said solid materials toward said helical member and to maintain said solid materials in contact with said helical member; and baffle means within said materials guide means, said baffle means being angled inwardly toward said helical member in the direction of rotation thereof.

6. The conveyor as defined in claim 5 wherein said materials guide means have a multiplicity of openings of a size sufficient to permit the passage of said solid material.

7. The conveyor as defined in claim 6 wherein said helical member has a rectangular cross-sectional configuration.

* * * * *